UNITED STATES PATENT OFFICE.

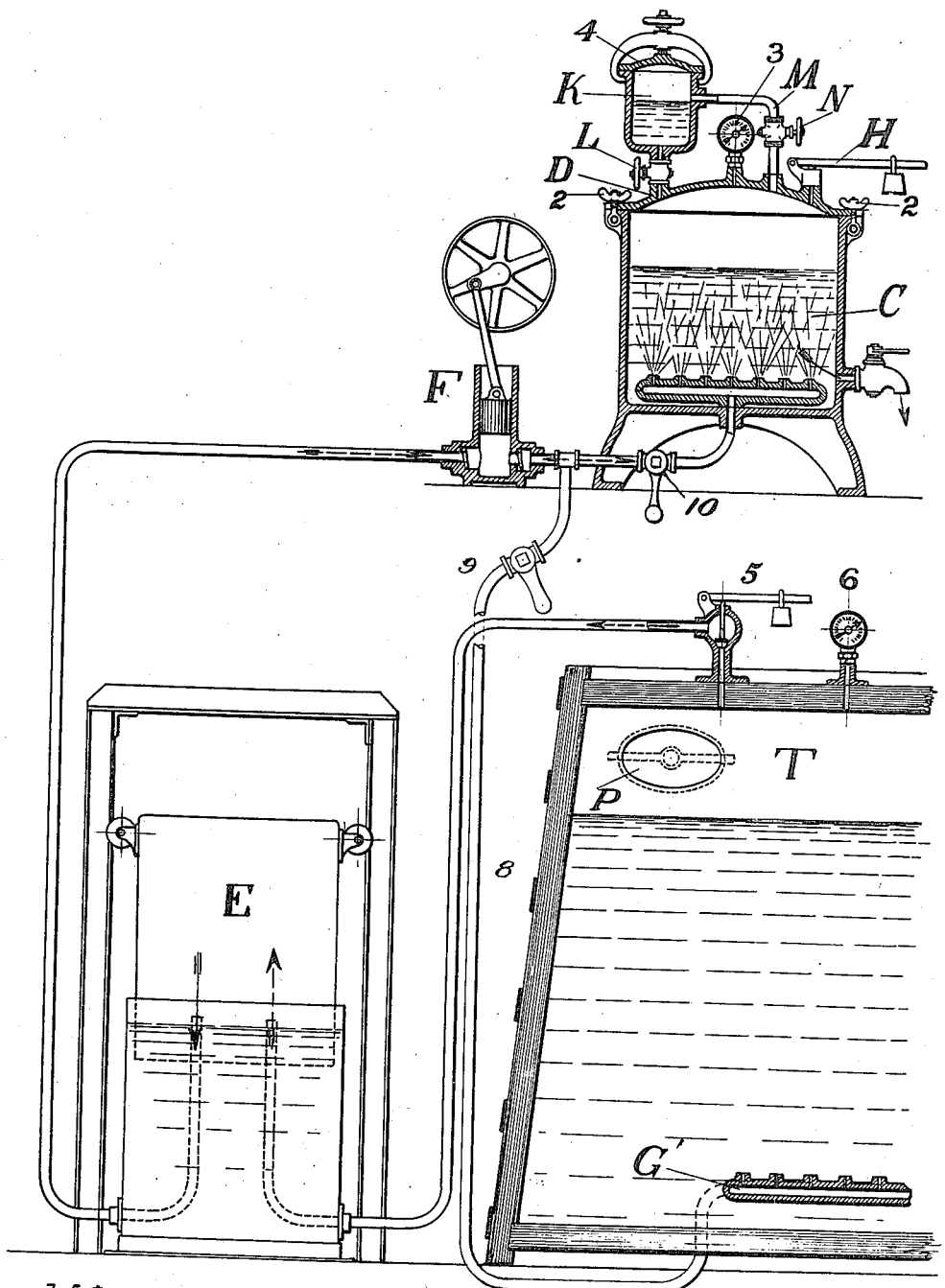

KARL KIEFER, OF CINCINNATI, OHIO.

PROCESS OF MAKING ALCOHOL.

1,041,298.      Specification of Letters Patent.    Patented Oct. 15, 1912.

Application filed February 11, 1907, Serial No. 356,845. Renewed March 18, 1912. Serial No. 684,536.

*To all whom it may concern:*

Be it known that I, KARL KIEFER, a citizen of the United States, residing at Cincinnati, in the county of Hamilton and State of Ohio, have invented a new and useful Improvement in the Process of Making Alcohol, of which the following is a specification.

The object of my invention is to improve the fermentation of saccharine liquors, especially to prevent the formation of bacteria and other detrimental ferments, to prevent the so-called after taste in alcoholic drinks, and to produce a high alcoholic strength and more complete change of the carbo hydrates into alcohol and carbonic acid.

My improved process is applicable to the fermentation of beer for drinking purposes made from grain and other substances used in the making of such beer.

The process is illustrated in the accompanying drawing, which shows a diagrammatical cross section through some of the apparatus which may be used in the execution of my improved process.

It is known that bacteria contaminate a wort almost as soon as same has been cooled down and brought in contact with the air. While I may aerate the wort or not, much or little, according to the requirements, it is especially at the beginning of the fermentation that I avoid the formation of bacteria and detrimental ferments by special means disclosed in the following.

It has been the experience that when an antiseptic is added to a wort strong enough to kill or hinder the formation of bacteria, but not strong enough to kill the alcoholic ferment, an improved and purer fermentation has been the result from such a wort, which has been mixed with such an antiseptic. Salicylic acid, fluoric acid, sulfurous acid and other antiseptics have been used for this purpose. The disadvantage of these antiseptics is that they are objectionable in the fermentation of drinks, or in feeding slop to animals; besides, the amount being hard to regulate, an over amount often killed the alcoholic ferment.

Now my invention consists partly of using a natural antiseptic, in fact, the most natural antiseptic to alcoholic ferments. This is carbonic acid itself. When carbonic acid reaches a certain degree of strength, it acts as an antiseptic upon the alcoholic ferment. According to the amount of carbonic acid I can regulate the strength of this antiseptic, and I can, by saturating the wort at different temperatures, and under different pressures, with carbonic acid, impregnate the wort more or less with carbonic acid gas.

In order to prevent a too slow fermentation of such a wort impregnated with carbonic acid, my process consists also in using a special kind of yeast, which acts actively even in the presence of a good deal of carbonic acid, and in order to obtain this yeast, I use the following means of successive natural culture.

In the accompanying drawing C is a strong walled vessel having an air tight cover, which can be screwed down by means of thumb screws 2, a safety valve H, a pressure gage 3 and two other openings controlled by stop cocks L and N. The stop cock L connects the vessel C with the lower part of a smaller similar vessel K, and the stop cock N controls the connection between the upper part of K and the upper part of the vessel C.

M is a connecting air tube between the vessel K and C. Vessel K can be closed by means of an air tight cover 4 and a traverse with a hand wheel.

F is an air compressor; E is a gas storage tank, and T a strong walled fermenting tank. This latter tank is also hermetically sealed, has a pressure gage 6, and a safety valve 5, allowing all escaping gas to collect in the gas storage tank E by means of a connecting tube. Assuming that the gas stored in E be carbonic acid, I use the compressor F for impregnating the sweet wort within C with carbonic acid gas by means of the injector G. An air connection 8 connects the air compressor F with the injector G and by means of the stop cock 9, I can regulate the admission of gas to G.

C may be filled two thirds full with a wort rich in extract matter for the production of a large amount of yeast. This yeast has been previously cooled to a temperature of from 60 to 80 degrees F., which is most favorable to fermentation. The wort may have been aerated more or less, which is not one of the steps of this process, although it may be of influence upon the alcoholic fermentation. I have found, however, that very little aeration is necessary for alcoholic fermentation, but aeration is of advantage for the production of a large amount of yeast.

In my improved process, the employment of carbonic acid as a germicidal agent will save a great amount of saccharine matter. Formerly, lactic acid had to be intentionally generated for the purpose of obtaining pure fermentation. By the employment of carbonic acid, however, part of the lactic acid is replaced by carbonic acid and the saccharine matter formerly used for the production of lactic acid is thereby saved.

I may now use any kind of yeast to infect the wort in C. Of course, the purer the yeast is in alcoholic ferments, the better it is to start with. This yeast I fill in the smaller vessel K, close this vessel air tight and establish connection between this vessel and C by means of L and N, whereupon all the yeast contained in K will drop into C. The mixing of the yeast with the wort can be easily accomplished by the injection of the carbonic acid gas, which will set in motion the whole wort, effecting a thorough mixing. The pressure I maintain in the vessel C can be varied from 20 to 100 lbs., according to the purity and strength of the yeast I want to obtain. By repeating this process in taking the yeast developed in C and filling K by subsequent operations, I will produce a yeast which is less sensitive to carbonic acid than the yeast ordinarily obtained, and such a yeast, when introduced into a sweet wort, will ferment a higher degree of alcohol and overcome the weaker ferment and bacteria by its more rigorous action.

The main fermentation of the wort for the process of making drinking beer, or for making beer for distillery purposes, is carried on in the large tank T in a similar manner as for making yeast alone. The tank T is filled up to nearly its top and with a saccharified wort brought down to a temperature of between 60 to 80 degrees F., or down to a lower temperature in the process of making beer for drinking purposes.

My process will work equally advantageously for temperatures more or less varied. Of course, the lower the temperature the slower the process, as in the present method of fermentation. I now impregnate this wort in the tank T with carbonic acid by the injector G' by means of the compressor F, using the carbonic acid gas from a previous fermentation, and, for instance, under a pressure of from 5 to 15 lbs., which is sufficient for the fermentation of beer, and when used with my yeast that has grown and is accustomed to a much higher pressure.

The yeast may be introduced through the man hole P or other openings and agitated and mixed with the wort by any proper means. The carbonic acid injected into this wort will kill or retard the life of the bacteria and the secondary ferments. The wort will not become decomposed by secondary ferments. While the process may be slower than at present, it is amply compensated for by the purity of the resulting fermentation. The beer having undergone a more thorough fermentation, will have better keeping qualities, and where a complete fermentation is wanted, the alcoholic yield is increased, which is valuable for making whisky and spirits.

Beer for distilling purposes may be freed from its carbonic acid after its fermentation, or it will free itself when introduced into a still where the carbonic acid is driven off by the heat. In the manufacture of beer for drinking purposes, my improved process consists in keeping the carbonic acid, derived from fermentation, within the beer during the process of filtering and finishing the same up to consumption.

What I claim as my invention and desire to secure by Letters Patent is:

1. The process of producing alcoholic liquors consisting of consecutively fermenting a saccharine wort under pressure and infecting a subsequent fermentation from previous fermentations under pressure so as to get the yeast accustomed to a large amount of carbonic acid.

2. The process of producing alcoholic liquors, consisting of impregnating a wort with carbonic acid, and fermenting the same, adding as a yeast a ferment accustomed to a large amount of carbonic acid.

3. The process of producing alcoholic liquors, consisting of impregnating the wort with carbonic acid under pressure, and fermenting same, adding as a yeast a ferment accustomed to a large amount of carbonic acid.

4. The process of producing alcoholic liquors, consisting of impregnating a wort with carbonic acid, and fermenting the same under pressure, adding as a yeast a ferment accustomed to a large amount of carbonic acid.

5. The process of producing alcoholic liquors, consisting of impregnating a wort with carbonic acid under pressure, and fermenting the same under pressure, adding as a yeast a ferment accustomed to a large amount of carbonic acid.

In testimony whereof, I have signed my name to this specification this 8th day of February, 1907, in the presence of two subscribing witnesses.

KARL KIEFER.

Witnesses:
SAML. J. WEIS,
G. W. WERDEN.